United States Patent
Ricci et al.

(10) Patent No.: US 11,955,845 B2
(45) Date of Patent: Apr. 9, 2024

(54) AXIAL FLUX ELECTRICAL MACHINE ROTOR WITH MAGNET RETENTION DEVICE

(71) Applicant: LaunchPoint Electric Propulsion Solutions, Inc., Goleta, CA (US)

(72) Inventors: Michael R. Ricci, Camarillo, CA (US); David B. Paden, Goleta, CA (US); Brian J. Clark, Santa Barbara, CA (US); Claire Cappe, Santa Barbara, CA (US); Zachary J. Marshall, Ventura, CA (US); Bradley E. Paden, Goleta, CA (US)

(73) Assignee: LaunchPoint Electric Propulsion Solutions Inc., Goleta, CA (US)

( * ) Notice: Subject to any disclaimer, the term of this patent is extended or adjusted under 35 U.S.C. 154(b) by 195 days.

(21) Appl. No.: 17/496,098

(22) Filed: Oct. 7, 2021

(65) Prior Publication Data

US 2022/0115925 A1    Apr. 14, 2022

Related U.S. Application Data

(60) Provisional application No. 63/090,224, filed on Oct. 10, 2020.

(51) Int. Cl.
*H02K 21/24* (2006.01)
*H02K 1/2793* (2022.01)
*H02K 1/28* (2006.01)

(52) U.S. Cl.
CPC ............. *H02K 1/28* (2013.01); *H02K 1/2793* (2013.01); *H02K 21/24* (2013.01)

(58) Field of Classification Search
CPC ...... H02K 1/2793; H02K 1/2798; H02K 1/28; H02K 21/24
See application file for complete search history.

(56) References Cited

U.S. PATENT DOCUMENTS 2,861,205 A * 11/1958 Kober ................. H02K 21/24
310/156.33
8,497,612 B2 * 7/2013 Minowa .................. F03D 9/25
290/55

* cited by examiner

*Primary Examiner* — Dang D Le
(74) *Attorney, Agent, or Firm* — Felix L. Fischer

(57) ABSTRACT

An axial flux motor incorporates a rotor having a plurality of pockets receiving magnet assemblies. A retention device is engaged from an inactive surface of at least one magnet assembly to one or more structural elements surrounding an associate one of the plurality of pockets in the rotor.

3 Claims, 13 Drawing Sheets

AXIAL FLUX ELECTRICAL MACHINE ROTOR WITH MAGNET RETENTION DEVICE

REFERENCE TO RELATED APPLICATIONS

This application claims priority of U.S. provisional application Ser. No. 63/090,224 filed on Oct. 10, 2020 entitled AXIAL FLUX ELECTRICAL MACHINE ROTOR WITH MAGNET RETENTION DEVICE having a common assignee with the present application, the disclosure of which is incorporated herein by reference.

BACKGROUND

Field of the Invention

This invention generally relates to electrical machines. More specifically, the present invention relates to magnet retention and rotor structure of brushless axial flux permanent magnet (PM) electrical machines.

Related Art

A Halbach array is arrangement of permanent magnets that creates a stronger field on one side while reducing the field on the other side to near zero. This is accomplished by orienting the magnets so that the magnetization directions rotate between adjacent magnets. The angle of rotation is typically 90 degrees or 60 degrees. This orientation focuses the magnetic field, strengthening the magnetic field of the working surface and reducing the field of the non-working surface to nearly zero. Electric motors based on the Halbach array offer measurable benefits over conventional designs, including high power density and high efficiency. Halbach arrays are typically used in the rotor of brushless motors but can also be used in the stator of a brushed motor. One of the enablers of these benefits is that a Halbach array motor does not require laminations or back iron, so the motor is essentially ironless. This significantly reduces eddy current losses and hysteresis losses—often referred to as "iron losses" or "core losses." One of the earliest references to the use of a cylindrical Halbach array in a motor is U.S. Pat. No. 5,705,902 by Richard Post that describes a radial flux Halbach array motor. Linear Halbach arrays that focus fields on one side of the array are also known and one example is U.S. Pat. No. 6,664,880B2 by Richard Post. The Halbach array can also be arranged in an annular ring such that the active surface faces along the axis of the annulus. This arrangement is particularly useful in an axial flux machine, such as the one disclosed in "Design of an in-wheel motor for a solar powered electric vehicle", Lovatt et al., "Design of an In-Wheel Motor for a Solar-Powered Electric Vehicle", IEEE Proc. Electrical Machines and Drives, No. 444, Sep. 1-3, 1997, 5 pages.

In prior embodiments of Halbach array devices a trapezoidal shape is employed for the magnets. The trapezoidal shape of the magnets minimizes the gaps between magnets and maximizes the magnetic field of the array. Less expensive rectangular magnets can be used, but this results in a lower magnetic field and large wedge-shaped gaps between the magnets at the periphery of the rotor. The adhesive bond is this design is subject to failure at high rotor speeds. U.S. Pat. No. 7,990,011 teaches an example of a Halbach array rotor structure for an axial flux machine where the trapezoidal magnets are bonded to one another to form an annular ring. Other examples of Halbach array rotors and variations thereof are taught in U.S. Pat. Nos. 8,994,239, 6,841,910, and 7,737,594. Since the magnets cannot withstand the centrifugal tensile forces from high-speed operation, those forces must instead be carried by the rotor structure such as the backing plate that the magnets are bonded to. If the rotor structure is very thick and heavy relative to the magnets there will only be a small strain in the rotor material, but if the rotor structure is thin and lightweight then the rotor materials must undergo a significant strain since they will be under significant centripetal tensile stress. The magnets, however, are brittle and cannot undergo significant strain without cracking. These magnets are bonded to the rotor structure, which is highly stressed and strained in a lightweight machine. Thus, the bond layer between the magnets and the rotor structure on the inactive surface of the Halbach array may fail or the magnets will end up being cracked as the rotor structure stretches and experiences strain due to the centrifugal loading. Should magnet failure occur, magnet pieces can become airborne within the rotor and cause excessive damage to the motor itself. It is therefore desirable to provide a method to retain such magnets and prevent them from contacting other components in the event of a bond failure.

SUMMARY OF THE INVENTION

The implementations disclosed herein minimize catastrophic failure to a vehicle and its payload due to magnet separation within a Halbach array rotor motor. An axial flux motor incorporates a rotor having a plurality of pockets receiving magnet assemblies. A retention device is engaged from an inactive surface of at least one magnet assembly to one or more structural elements surrounding an associate one of the plurality of pockets in the rotor.

The implementations disclosed herein provide a method for retaining magnets in an axial flux motor. In general, a plurality of magnet assemblies are placed in a plurality of pockets in a rotor and each magnet assembly is adhered to an active surface wall in an associated one of the plurality of pockets with epoxy or other adhesive as a principal load path. An alternate load path is provided between at least a portion of an inactive surface of the magnet assembly and structural elements of the associated pocket.

DETAILED DESCRIPTION

Figure 1A:
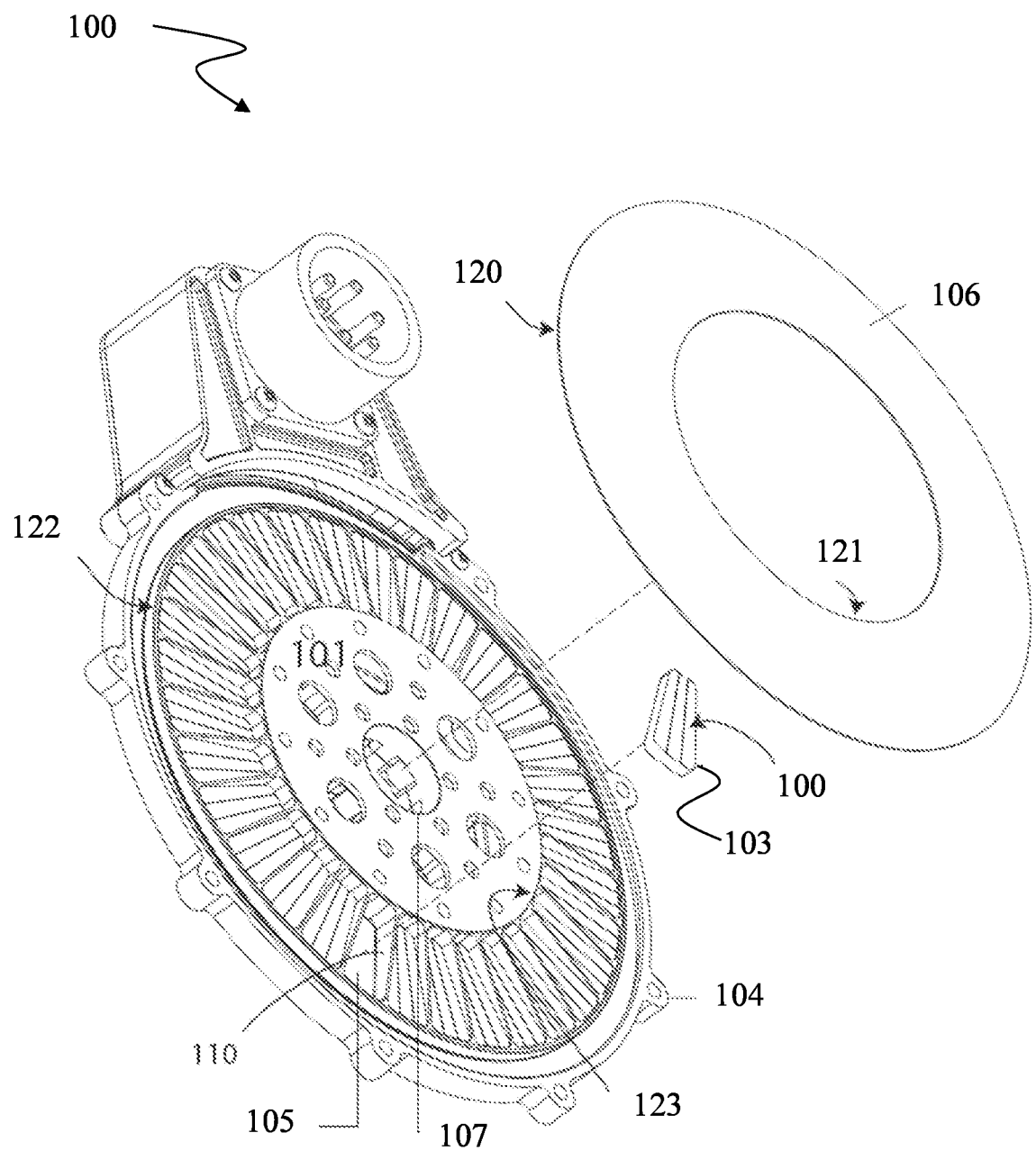
FIG. 1A shows a partially exploded perspective view of an implementation of a Halbach array rotor motor having a rotor without magnet retention devices and one bonded magnet assembly and the inactive surface wall exploded.
Figure 1B:
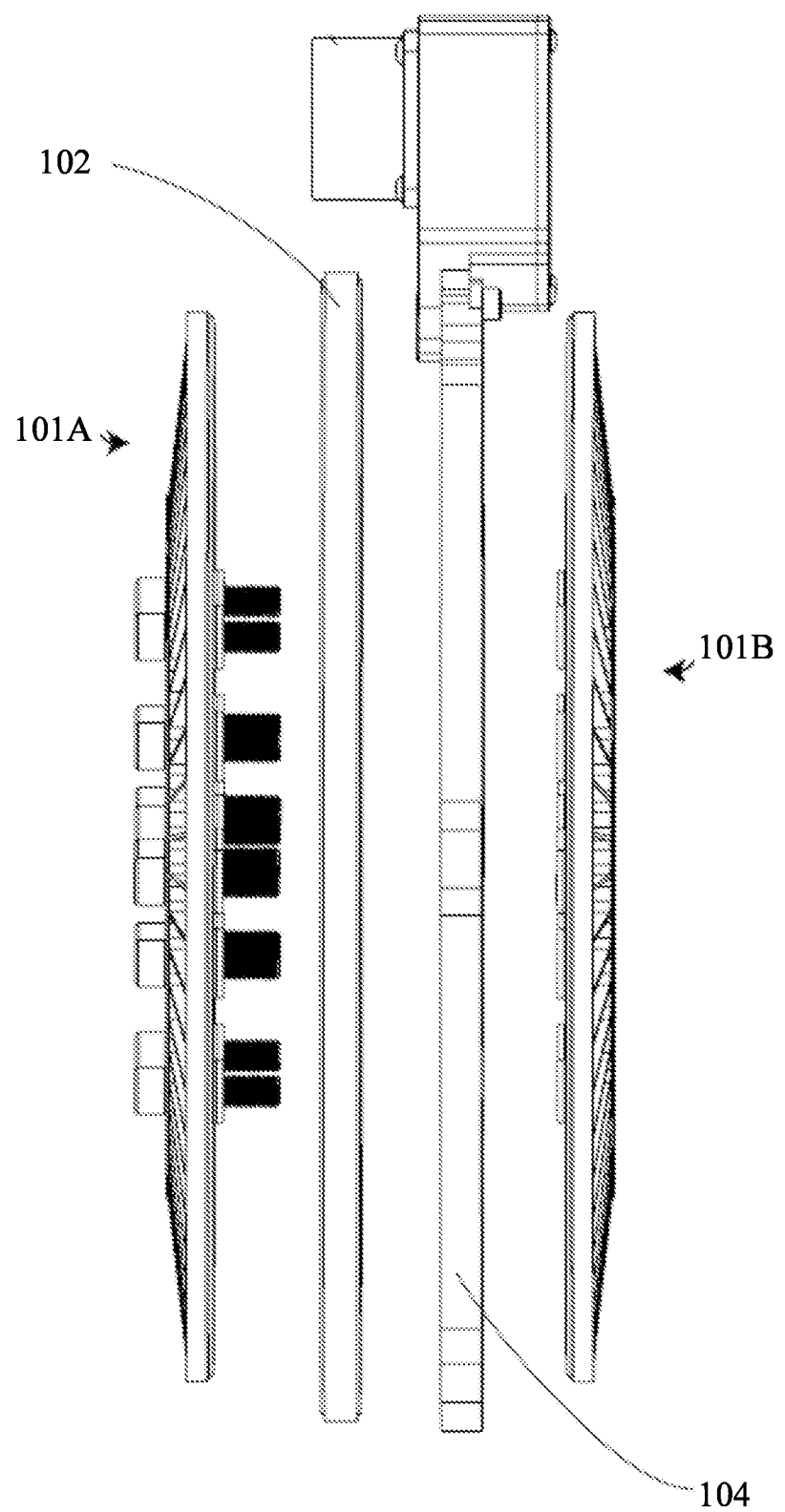
FIG. 1B is a side view of the motor of FIG. 1A with the stator, rotor and without the inactive surface wall.

The example implementations described herein include a rotor for an axial flux permanent magnet brushless electrical machine using a Halbach array of magnets in the rotor. The invention is an improvement upon the disclosure in U.S. Pat. No. 10,468,955 "Axial flux brushless permanent magnet electrical machine rotor" having a common assignee with the present application, the disclosure of which is hereby incorporated by reference. Referring now to the drawings wherein like reference numerals designate corresponding structure throughout the views, FIGS. 1A and 1B show an electrical machine 100 having a stator 102 held in a support structure 104. A top rotor 101A incorporates a plurality of pockets 105 having tapered side pocket walls 110 receiving magnet assemblies 103, a rotor shaft mounting hole 107 and an inactive surface wall 106. The top rotor 101A is held concentric with the stator 102 by a rotor shaft (not shown). In the implementation shown, the inactive surface wall 106 is frustoconical consistent with the tapered side pocket walls 110. The inactive surface wall 106 may be flat in an alternate implementation. In the example implementation shown, the inactive surface wall 106 is vacuum laser welded to the rotor 101A along outer circular edge 120 and inner circular edge 121 to mating circular outer rim 122 and inner rim 123 of the rotor, respectively. The number of Halbach array magnets per pocket can vary and the number per pocket shown in FIG. 1A is three. Each pocket corresponds to one magnetic pole, and, since there are two poles per cycle, there are six magnets per cycle and adjacent magnets differ in magnetization direction by 60 degrees. The groups of three magnets in each magnet assembly 103 are bonded together along bond lines 108, one of which is labeled as an example. FIG. 1A does not show the magnet retention devices, described in detail subsequently.

FIG. 1B shows the implementation of the electrical machine with the top rotor 101A, stator 102 and bottom rotor 101B exploded from the support structure 104. The structure of bottom rotor 101B is substantially a mirror image of the structure of the top rotor 101A described above. It is to be understood that the implementation shown represents a complete electrical machine comprising rotors, magnet retention devices, at least one stator, a housing, a shaft, and bearings. However, a frameless electrical machine solely having rotor plates and the stator also constitutes an implementation of the invention that may be incorporated into other machines that provide the bearings, shafts, and support structures.

Figure 2:
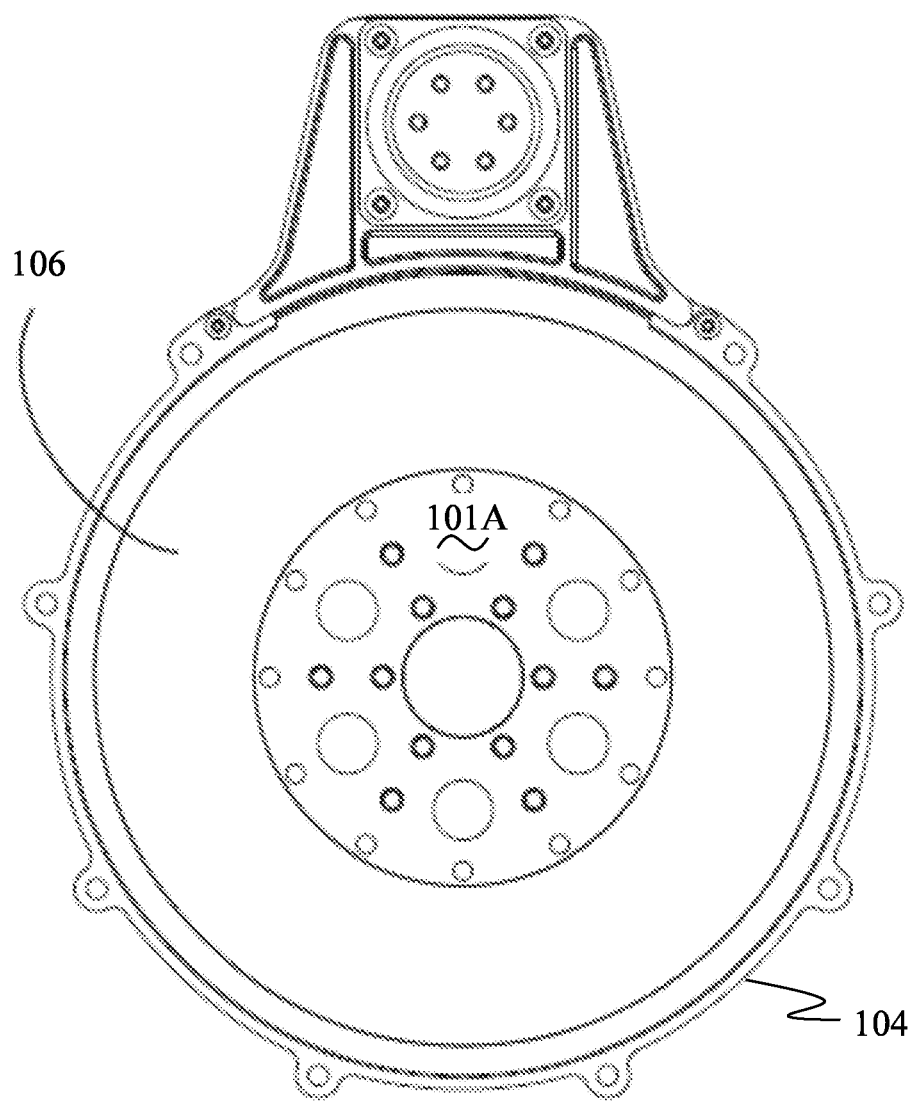
FIG. 2 shows front view of the rotor and the periphery of the stator.
Figure 3:
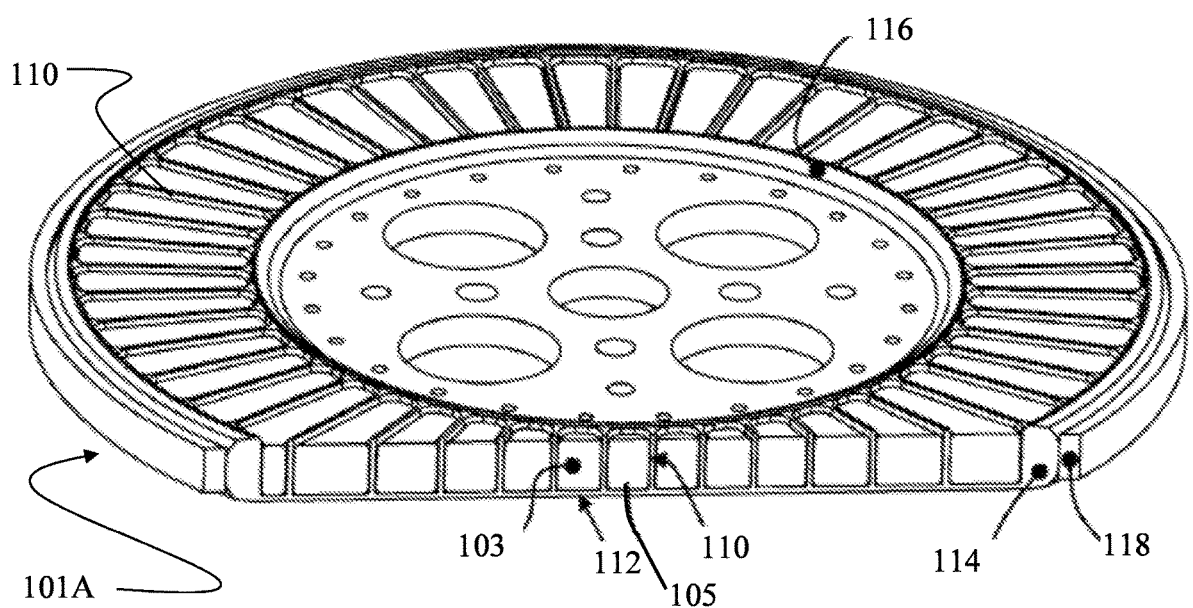
FIG. 3 is a partial section pictorial representation of the rotor.

Referring now to FIGS. 2 and 3 each rotor (101A shown in FIGS. 2 and 3 and 101B as a mirror image with identical structure) is a circular structure that contains a Halbach array of magnet assemblies 103 in the plurality of pockets 105 in annular regions of the rotors. The magnet assemblies 103 are arranged to create a field that projects on one side of the rotor that varies nearly periodically around the circumferential direction of the rotor. The Halbach array may contain magnet assemblies 103 having three magnet elements per magnetic cycle with the orientation of the magnetization of each magnet varying by 90 degrees from the previous magnet; or the Halbach array may have more magnetic elements per magnetic cycle, six elements per cycle being one example with the magnetization direction of each magnet varying by 60 degrees from the previous magnet. Other magnet counts per cycle are also possible. These alternative magnet counts per cycle may be employed in alternative implementations. As used herein "magnet assembly" or magnet assemblies may be a single magnet or multiple magnet elements arranged in the described orientations. In the example implementation, the rotor structure has pockets 105 in the annular region between the outer rim 122 and inner rim 123 into which the magnet assemblies of the Halbach array are inserted. Pocket side walls 110 and pocket active surfaces wall 112 locate the magnet assemblies and provide strength to the rotor structure.

With reference to FIG. 3, the pocket side walls 110 extend radially between circumferential outside diameter (OD) walls 114 that counter centrifugal forces applied to the magnets and circumferential inside diameter (ID) walls 116. Each OD wall 114 may be made of two materials and separate strength member band 118 made of stronger or stiffer material may surround the OD walls 114 to help contain the magnet centrifugal forces. One example of the strength member band 118 is a filament-wound composite hoop that has high stiffness due to the directional nature of the filament-wound fibers. The composite hoop is typically carbon-epoxy composite. The ID wall 116 may be omitted in certain implementations as centrifugal forces dominate in the support of the magnet assemblies 103. An active surface wall 112 under the pocket 105 or the inactive surface wall 106 can be integrally formed, welded, adhered, or otherwise attached to the rotor to protect the magnet assemblies 103 from corrosion or damage and add strength to the rotor. The pockets 105 may also have only an active surface wall 112 or an inactive surface wall 106 with the radial pocket walls 110 being only partial walls or locational features.

The plurality of pockets 105 configured to receive the magnet assemblies 103 can be machined into a disk of the material, or the material can be built up additively. In the case of a metallic or plastic rotor, 3D printing techniques such as SLS (selective laser sintering) or FDM (fused deposition modeling) can be used to fabricate the rotor. In the case of a composite material standard molding and layup/impregnation techniques can be used to manufacture the pockets. The OD walls 114 may be formed partially or completely by a hoop-wound composite structure. The rotor structure may also be a combination of materials such as but not limited to a metallic or polymer disk and pocket structure with composite fiber reinforcements added as an outer hoop or active or inactive surface covers over the magnet assemblies. The pockets 105 may also be formed by casting or stamping/forging operations; possibly with some post-machining operations; or by injection molding. A pocketed plate may also be formed by extruding a long section containing all the pockets and then cutting off slices for each individual rotor plate. When the pocket does not extend through the rotor, a pocket surface wall (the active surface wall 112 or inactive surface wall 106) provides mechanical location of the magnet assemblies during assembly and provides a bonding area for the magnet assemblies to be bonded into the rotor. In the example implementations herein where pocket surface wall is the active surface wall 112, the wall is located on the active side of the Halbach array adjacent the machine magnetic air gap and the active surface wall also serves as a mechanical retaining feature that prevents a magnet assembly that comes un-bonded from moving into the machine air gap and jamming the machine.

Regardless of the location and orientation of the pockets and walls, the magnet orientations are a Halbach array which focuses the magnetic field on the active side of the rotor where the stator 102 is placed. In the present implementation of the Halbach array, material forming the side walls 110 is placed between magnet assemblies while keeping the periodic orientations of magnets commonly used in Halbach arrays. It may be the case that a magnet or magnet assembly 103 is split so that structural material may be inserted in a particular location or material may be placed in between some of the magnets or some combination thereof, the material then forming pocket walls. Sub-groups of magnets may be bonded directly together to form the magnet assemblies, and then each magnet assembly is received in a pocket instead of having one pocket for each individual magnet.

Figure 4:
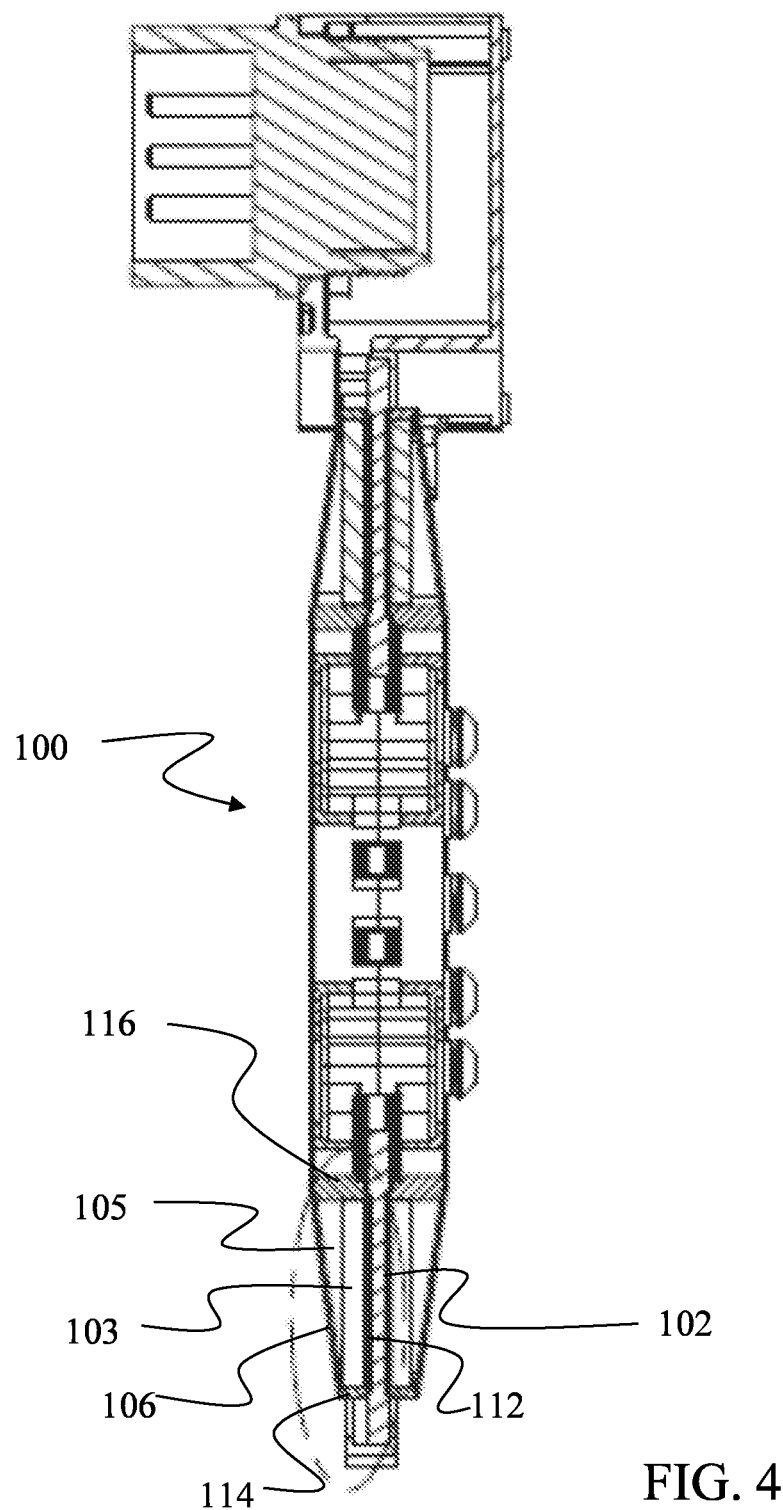
FIG. 4 shows a section view of the rotor without magnet retention devices.

FIG. 4 shows a section view of the motor in FIG. 1A with magnet assemblies 103 bonded to the active surface wall 112 in the pockets 105 but with no magnet retention device. Affixing magnets to rotors generally involves using a layer of epoxy between the active face of the magnet array and the active surface wall 112 of the rotor. This provides a degree of heat insulation for the magnet because the epoxy is not a good conductor and also avoids adding unnecessary weight or structural complexity to the rotor which would undesirably decrease its power density. Due to rotor dimensional changes that occur under use resulting from centrifugal force and heat absorption this prior art epoxy layer is engineered to be thick enough to provide a degree of reversible flexibility within the bonded joint so it can expand or distort without fracture or dislocation.

The present implementations, described below, provide at least one additional retention device from at least a portion of the inactive face of the affixed magnet assemblies 103 to the rotor 101A, 101B. This load path created by the at least one additional retention device can be formed from adhesives, such as the epoxy employed for the active face bond or from additional structures extending from the inactive face of the bonded magnet to structural elements of the rotor. This load path is not subjected to the mechanical distortions experienced by the bonded joint between the active side of the magnet and the active surface wall 112 of the rotor so, if formed of epoxy it does not have to be engineered to the same thickness and degree of flexibility as the active side bond. It also does not need to insulate the inactive face from rotor heat absorption. In fact, it can be engineered to facilitate air cooling of the magnet inactive face.

The disclosed implementations enhance the safety and reliability of the lightweight, high-energy-density rotor in operation by providing both an enhanced or reinforced strength to the bonding affixing the individual magnet assemblies to the rotor and, in the event that a bonded attachment does fail, to reduce the chances of the detached magnet being displaced from its mounting position sufficiently to mechanically interfere with the operation of the rotor. Generically speaking, this is accomplished by providing a load path from the inactive side of the magnet assembly to the rotor in addition to the typical bonded load path from the active side of the magnet assembly to the rotor. This secondary load path is provided by the retention devices of the various disclosed implementations shown and can include adding inactive surface wall 106, which is typically vacuum welded to the rotor, and biasing members between the inactive surface wall 106 and the magnet assemblies 103 to urge the active side of the magnet assembly against the active surface wall 112 of the rotor. However, in its simplest form the additional inactive side load path can include adhesive bonding material (like that bonding the active side of the magnet to the rotor) around one or more sides of the magnet and at least a portion of its inactive surface and engaging at least a portion of the structure of the respective pocket 105 on the rotor.

Figure 5:
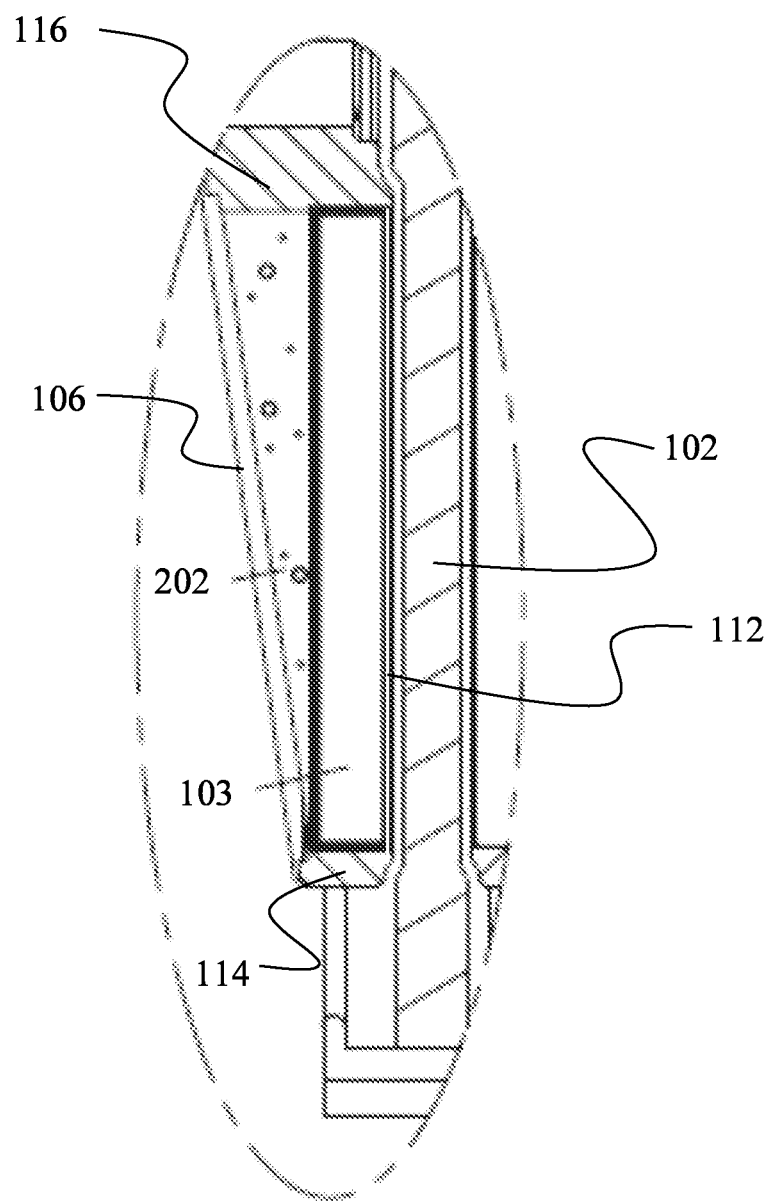
FIG. 5 shows a close-up section view of a foam implementation of an example magnet retention device.

FIGS. 5-9 show various implementations that have various retention devices retaining magnet assemblies 103 within pockets 105 and include an inactive surface wall 106. FIG. 5 shows a close-up where space between the magnet assembly 103 and the inactive surface wall 106 is filled with a foam 202. Thus, if the epoxy bond fails, the magnet assembly 103 will be retained by the foam acting as the retention device. The foam can be formed in place by injecting liquid reactants into the space via a small hole in the inactive surface wall 106. The reactants can then expand to fill the space. Such a reaction is common in the formation of urethane foams.

Figure 6:
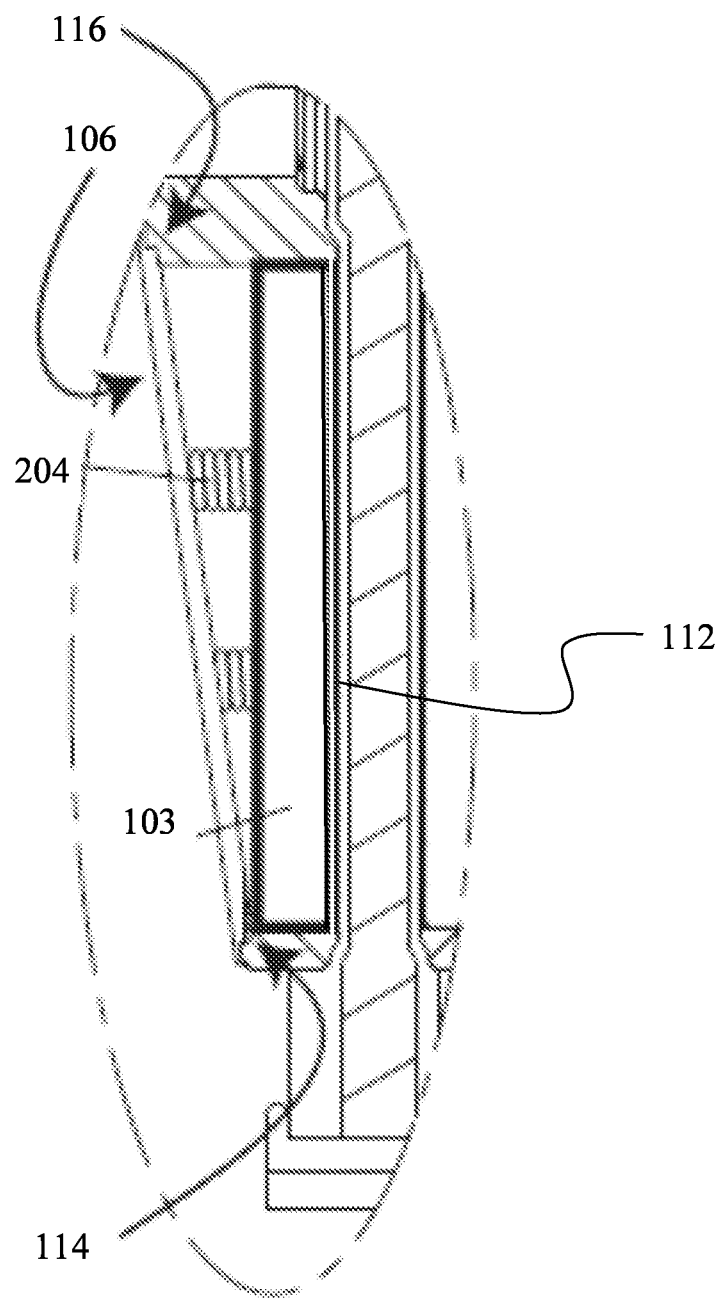
FIG. 6 shows a close-up section view of a spring implementation of the example magnet retention device.

FIG. 6 shows an implementation wherein the magnet assemblies 103 are retained by springs 204. The springs can be coil springs, leaf springs, or any elastic structure that bridges the gap between the magnet assembly 103 and the inactive surface wall 106 as the retention device. Prior to welding on the inactive surface wall 106, the springs 204 are installed on the magnet assemblies 103 and are depressed by the inactive surface wall 106 maintaining positive spring pressure on the magnet assembly 103, urging the magnet assembly onto the active surface wall 112 to keep the magnet assembly in place.

Figure 7:
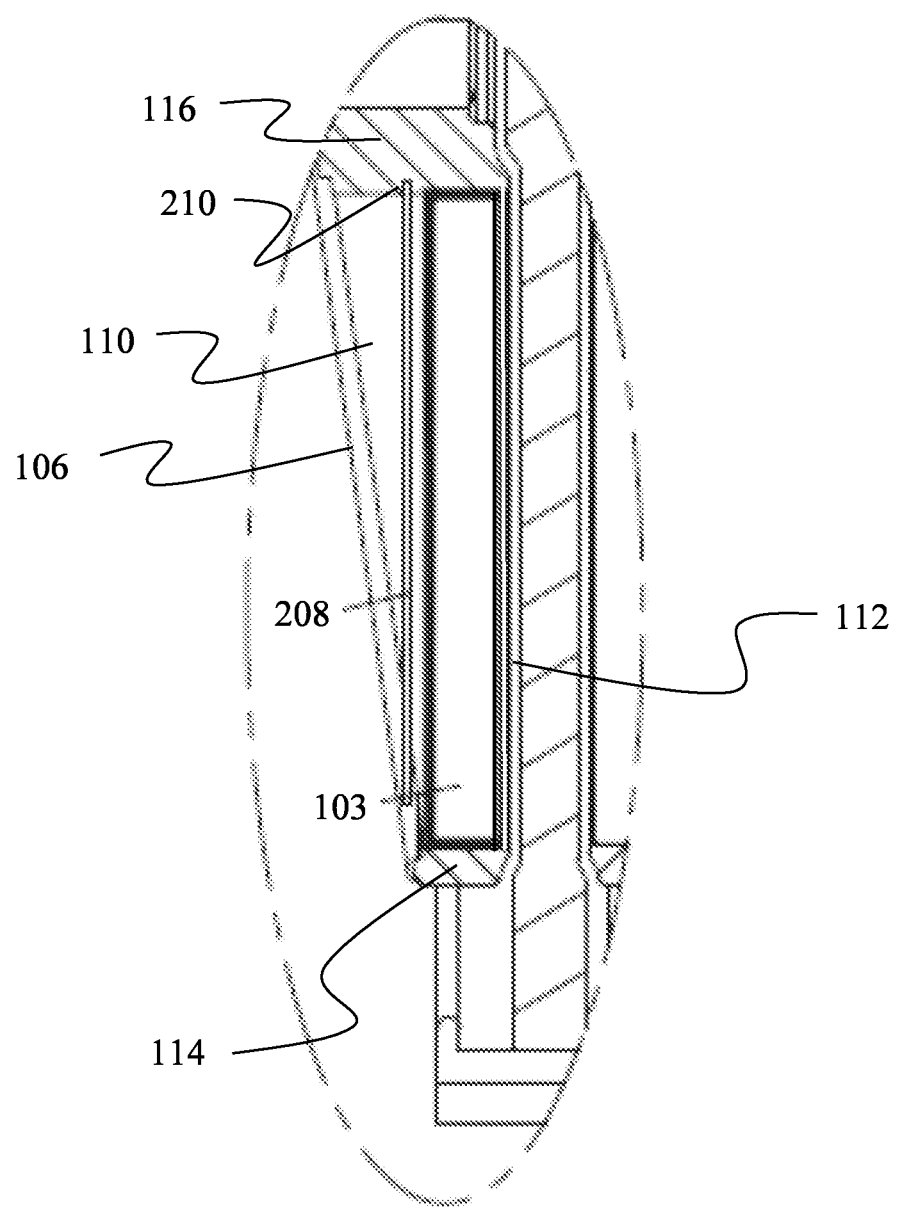
FIG. 7 shows a close-up section view of a C-clip implementation of the example magnet retention device.

FIG. 7 shows an implementation with a C-clip 208 contained in the pocket 105 as the retention device to retain the magnet assemblies 103. The OD walls 114 and side walls 110 incorporate a slot 210 to receive the C-clip 208. In alternative implementations, the side walls 110 alone may incorporate the slots to receive the C-clips or slots may be present in 3 or 4 of the walls. Spacing in the figure is exaggerated for clarity of the elements. C-clips 208 provide an axial stop so that magnet assemblies 103 cannot be displaced from the active surface wall 112.

Figure 8:
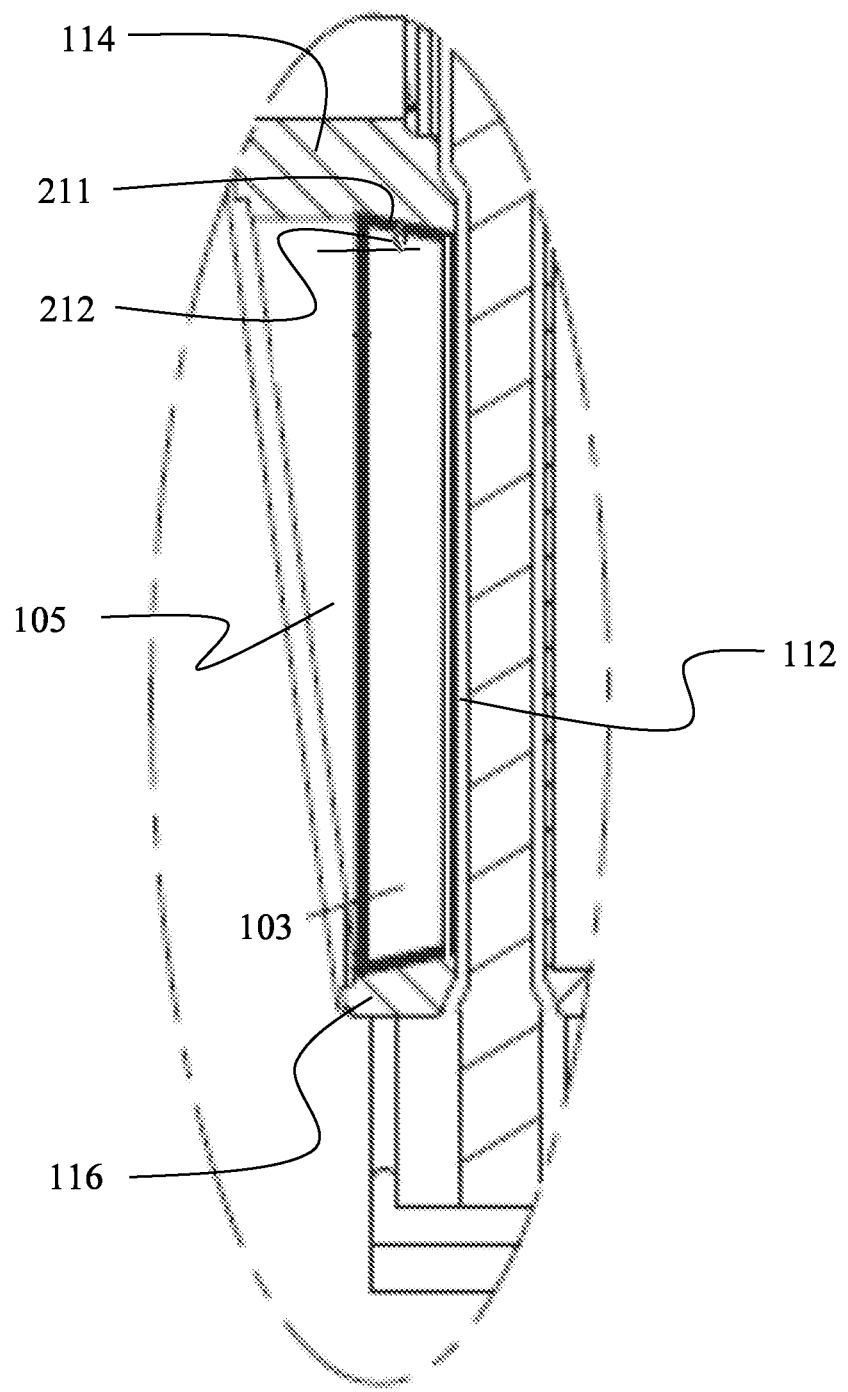
FIG. 8 shows a close-up section view of a friction fit implementation of the example magnet retention device.

FIG. 8 shows a mechanical interference fit implementation. The interference fit is formed between magnet assemblies 103 and pockets 105. The interference fit can be attained with a press-fit, or a thermal compression fit. In a press fit implementation, the pocket 105 is configured to receive the magnet assembly 103 with engagement of lateral surfaces 211 of the magnet assembly 103 frictionally received by at least two opposing walls in the pocket, the OD circumferential wall 114 and ID circumferential wall 116 in the implementation of the drawing. Additionally, the magnet assembly 103 and associated OD and/or ID walls 114, 116 may be configured with a press fit taper angle 212 to engage at least one of the pocket walls (two shown in the example implementation). In the case of a thermal compression fit, the rotor 101A, 101B is heated prior to inserting the magnet assemblies and the pockets 105 in the rotor are configured whereby contraction of the pockets during cooling captures the magnet assemblies 103 between the side walls 110 and/or OD and ID walls 114, 116. Alternatively, the magnet assemblies 103 can be cooled or a combination of heating the rotor and cooling the magnets can be used. The pocket 105 is configured to allow insertion of the magnet assembly 103 with an imposed temperature differential between the rotor and magnet assembly and to frictionally engage the magnet assembly upon removal of the imposed temperature differential and equilibration of the temperatures of the rotor and magnet assembly. A taper may or may not be present for the thermal compression fit. The interference fit between the magnet assemblies 103 and pockets 105 prevents movement of the magnet assemblies if the epoxy bond fails.

Figure 9:
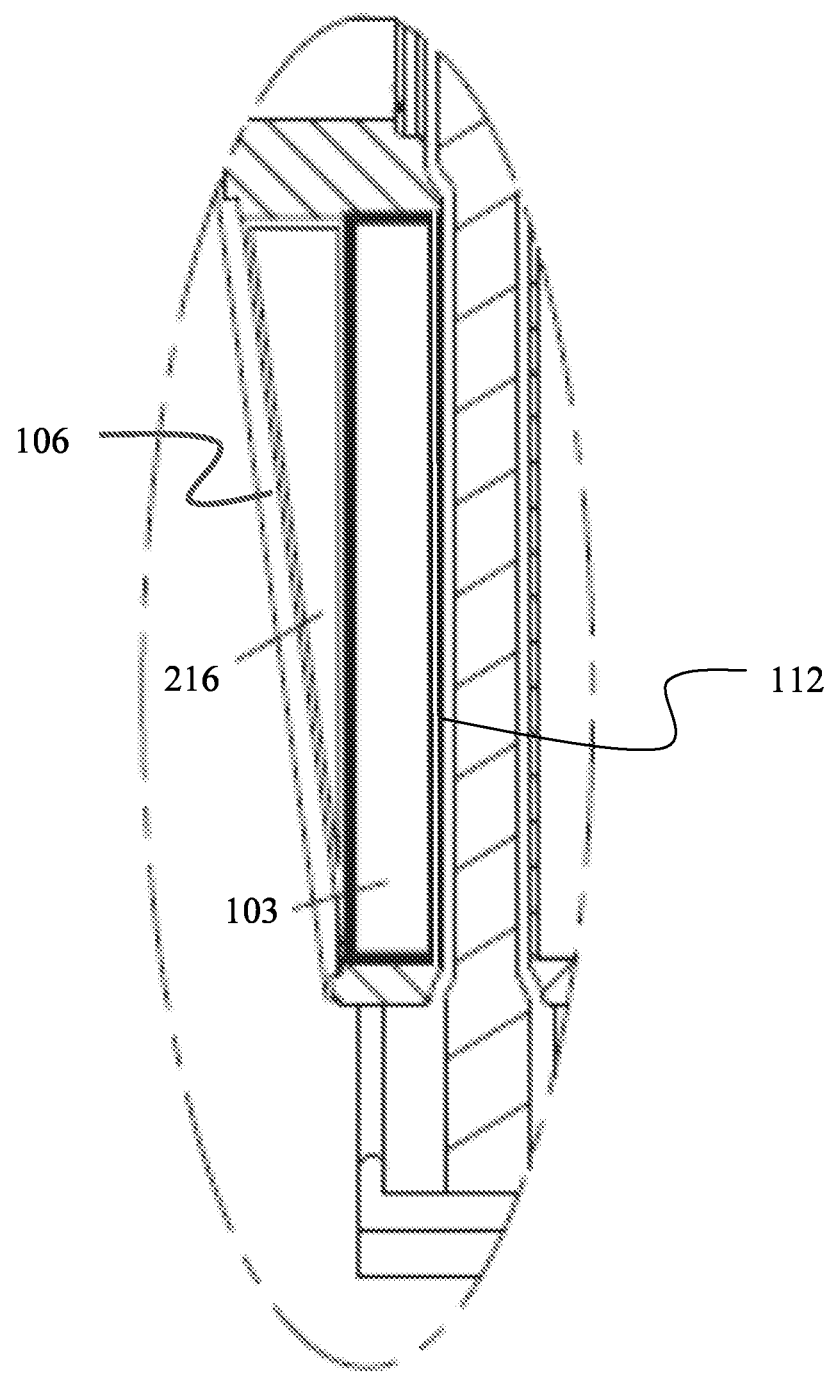
FIG. 9 shows a close-up section view of a spacer implementation of the example magnet retention device.

FIG. 9 shows an axial spacer 216 implementation that takes up the axial space between the top of the magnet and the inactive surface wall 106. A pre-formed void-filling structure such as a shim provides the retention device between the inactive surface of the magnet assembly 103 and the inactive surface wall 106 that does not allow magnet assembly 103 to move. Spacers 216 are preferably of minimal mass and will have lightening holes, be 3D-printed truss structures, formed from sections of tubes, formed from folded sheet metal, or fabricated in any way so long as a load path is created between the magnet and the rotor or inactive surface wall 106.

Figure 10:
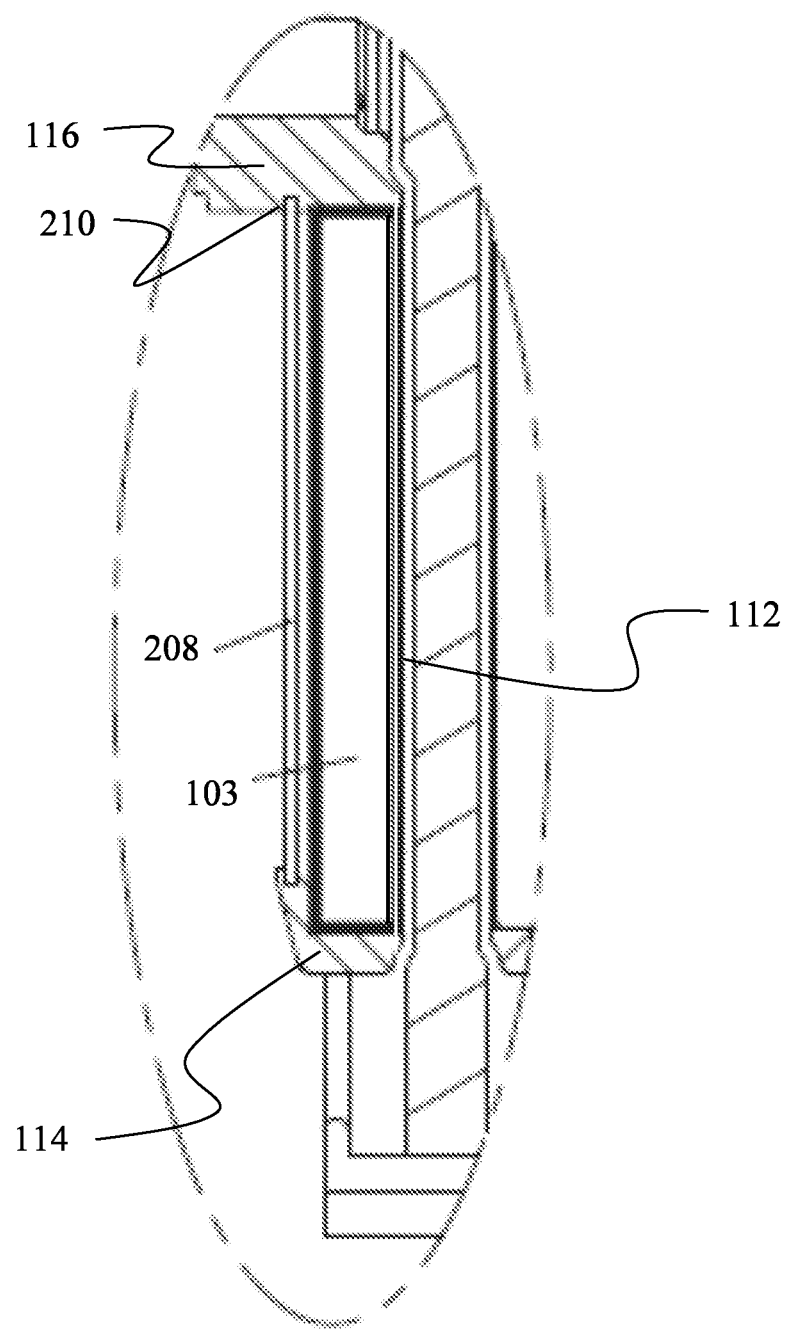
FIG. 10 shows a close-up section view of a C-clip implementation of the example magnet retention device that does not incorporate the inactive surface wall.

FIG. 10 shows a C-clip implementation without an inactive surface wall 106. Similarly, FIG. 11 shows an interference fit without an inactive surface wall 106.

Figure 11:
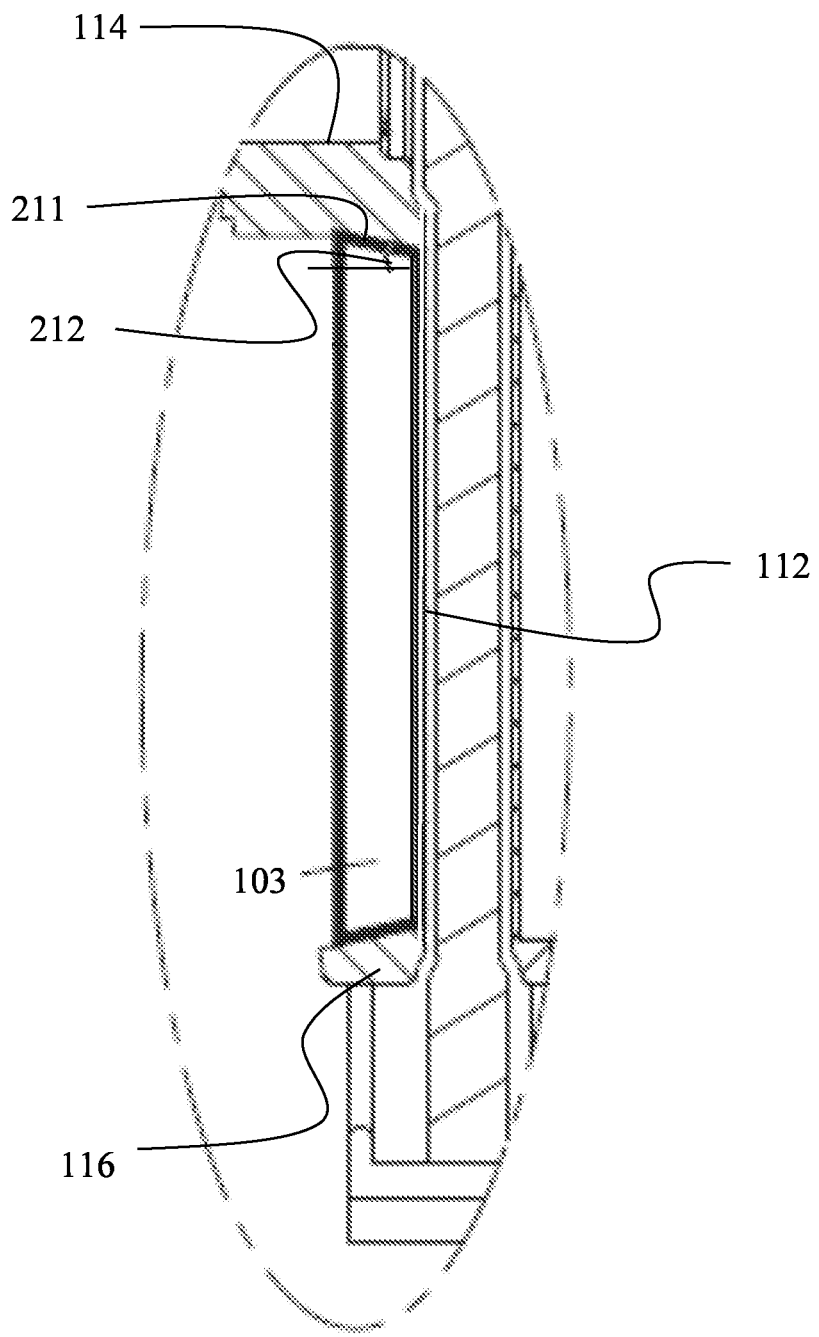
FIG. 11 shows a close-up section view of a friction fit implementation of the example magnet retention device that does not incorporate the inactive surface wall.
Figure 12:
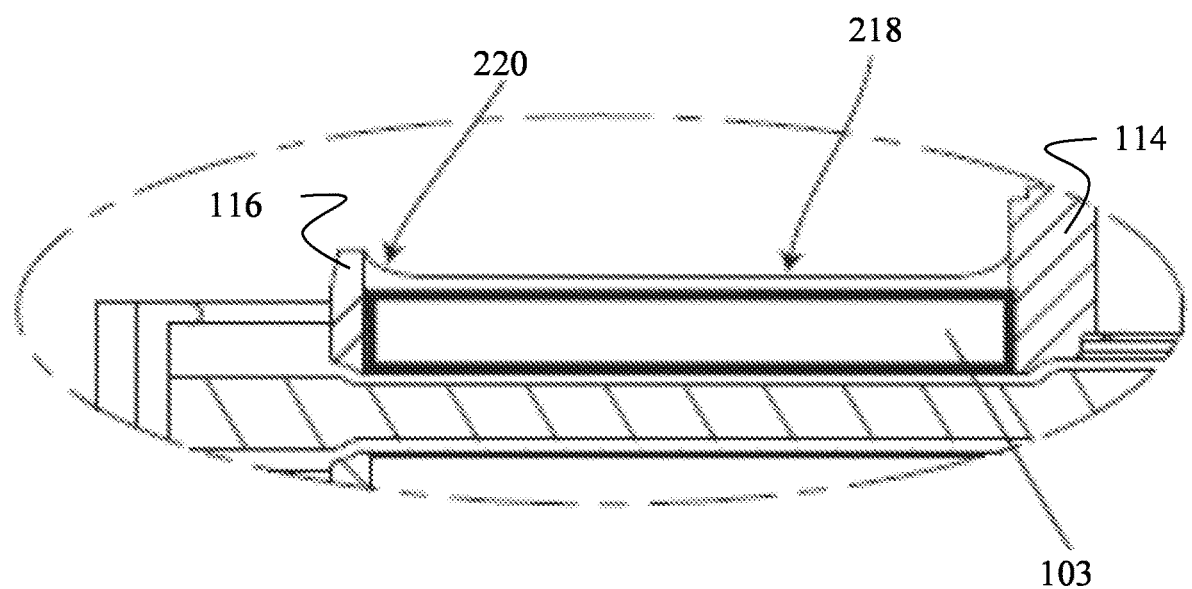
FIG. 12 shows a close-up section of view (rotated 90 degrees relative to FIG. 11) of a poured epoxy layer implementation.

FIG. 12 shows a rotated view relative to FIG. 11 with a poured epoxy layer 218 that forms a meniscus 220 with respect to the pocket side walls 110, OD wall 114 and ID wall 116 prior to hardening. The added area of contact with the pocket side walls 110, OD wall 114 and ID wall 116 shown in the drawing, due to the meniscus 220 improves the strength of this retention implementation with the epoxy layer and meniscus forming the retention device. The orientation of FIG. 12 is that which would be used when the epoxy is poured over the magnet assemblies 103.

Other implementations may include locking features on both magnet assemblies 103 and pocket 105 that allow for positive retention of the magnet assemblies 103 even if there is no epoxy adhesive such as bosses, shoulders, dovetail, slots, etc. These mating features would also capture magnet assemblies 103 and not allow them to move axially. The essential function of the magnet retention implementations is the provision of a mechanical load path from the magnet surfaces on the inactive side of the Halbach array to the rotor or the inactive surface cover. Such devices are referred to as magnet retention devices for axial flux motors. The load path might only be utilized upon the failure of an epoxy or other adhesive bond to the rotor on the active side of the Halbach array.

The implementations disclosed herein provide a method for retaining magnets in an axial flux motor. In general, a plurality of magnet assemblies are placed in a plurality of pockets in a rotor and each magnet assembly is adhered to an active surface wall in an associated one of the plurality of pockets with epoxy as a principal load path. An alternate load path is provided between at least a portion of an inactive surface of the magnet assembly and structural elements of the associated pocket.

The implementation of FIG. 5 provides the alternate load path by expanding foam in a void in the associated pocket between the magnet assembly 103 and the inactive surface wall 106.

The implementations of FIGS. 6 and 9 provide an alternate load path by compressing one or more springs 204 or spacers 216 between the inactive surface wall 106 and the magnet assembly 103.

The implementations of FIGS. 7 and 10 provide an alternate load path by engaging a C-clip 208 proximate the inactive surface of the magnet assembly 103 in slots 210 in two or more of radial side walls 110, and circumferential OD walls 114 and circumferential ID walls 116 forming the associated pocket 105.

The implementation of FIG. 12 provides an alternate load path by pouring an epoxy layer 218 on the inactive side of the magnet assembly that forms a meniscus 220 with respect to the radial side walls 110 forming the plurality of pockets 105, and the circumferential OD walls 114 and the circumferential ID walls 116 prior to hardening.

The implementations of FIGS. 8 and 11 provide an alternate load path by frictionally engaging the magnet assembly between at least two of the radial side walls 110 forming the plurality of pockets 105, and circumferential OD walls 114 and circumferential ID walls 116 in each of the plurality of pockets 105, in an interference fit.

It is additionally noted and anticipated that although the example implementations are shown in their simplest form, various components and aspects of the device may be differently shaped or slightly modified within the scope of the claims herein. As such those skilled in the art will appreciate the descriptions and depictions set forth in this disclosure or merely meant to portray examples of preferred modes within the overall scope and intent of the claims and are not to be considered limiting in any manner. While all of the fundamental characteristics and features of the invention have been shown and described herein, with reference to particular implementations thereof, a latitude of modification, various changes and substitutions are intended in the foregoing disclosure and it will be apparent that in some instances, some features of the disclosed implementations may be employed without a corresponding use of other features without departing from the scope of the invention as set forth.

What is claimed is:

1. An axial flux motor comprising:
    a rotor having radial side walls with circumferential OD walls and circumferential ID walls forming a plurality of pockets, each pocket in the plurality of pockets receiving one of a plurality of magnet assemblies with each magnet assembly of the plurality of magnet assemblies adhered to an active surface wall in an associated one of the plurality of pockets with epoxy as a principal load path;
    wherein a retention device providing an alternate load path comprises a poured epoxy layer on an inactive surface of the each magnet assembly that forms a meniscus with respect to the pocket side walls, OD wall and ID wall prior to hardening.

2. A method for retaining magnets in an axial flux motor, the method comprising:
    placing a plurality of magnet assemblies in a plurality of pockets in a rotor;
    adhering each magnet assembly of the plurality of magnet assemblies to an active surface wall in an associated one of the plurality of pockets with epoxy as a principal load path;
    providing an alternate load path between at least a portion of an inactive surface of the magnet assembly and structural elements of the associated pocket.

3. The method as defined in claim 2 wherein the step of providing an alternate load path comprises pouring an epoxy layer on the inactive side of the magnet assembly that forms a meniscus with respect to radial side walls forming the plurality of pockets, and circumferential OD walls and circumferential ID walls in the plurality of pockets prior to hardening.

* * * * *